INVENTOR:
DONALD W. MAYER
BY
Eyre, Mann & Lucas
ATTORNEYS.

United States Patent Office 3,327,155
Patented June 20, 1967

3,327,155
SEALED BEAM LAMP WITH COLORED FILTER
Donald W. Mayer, New Market, N.J., assignor, by mesne assignments, to Tung-Sol Industries, Inc., Newark, N.J., a corporation of Delaware
Filed Sept. 28, 1964, Ser. No. 399,452
8 Claims. (Cl. 313—111)

This invention relates to a sealed beam lamp with a plain glass color filter enclosed within the lamp envelope. It has particular reference to the method of supporting the filter glass so that it will not be heated above a predetermined temperature during the sealing operation when the lamp is assembled.

The advantages of sealed beam lamps are well known. The reflective surface in such lamps is positioned within the lamp and is protected from the ambient atmosphere and dirt. Such lamps may be accurately adjusted so that their directed beams proceed in a desired direction. For the above reasons it is also desirable to enclose a filter glass within the vacuum envelope and thereby remove its surfaces from contamination with dirt and changes in humidity. However, it is extremely difficult to make filter glasses which do not change color permanently when heated to glass-softening temperatures. It is always desirable to use a filter glass which extends to the periphery of the lamp reflector so that no unfiltered light can escape around the edges. For this reason, the edge of the filter glass generally extends to the sealing position where it must absorb considerable heat from the sealing operation. The present invention supports a filter glass within the envelope and protects its edges from the high temperature required during the sealing operation. The filter glass is firmly supported in place and retains its color filtering characteristics indefinitely.

One of the objects of this invention is to provide an improved structure for holding a filter glass within the envelope of a sealed beam lamp.

Another object of the invention is to seal a colored light filter within a lamp without raising the temperature of the filter glass above a desired temperature.

Another object of the invention is to retain the filtering qualities of colored filter glasses within a sealed beam lamp by means of a controlled clamping arrangement.

Another object of the invention is to widen the range of colored filter glasses to include those which change color when heated above 300 degrees centigrade.

Another object of the invention is to seal a colored filter glass within a sealed beam lamp without substantially changing the exhaust and sealing operations.

The invention comprises a sealed beam lamp having a base section which includes the usual lead-in conductors for supporting one or more filaments. The lamp has the usual concave reflector surface and is formed with an inner annular ridge. An outer sealing edge on this base section is positioned adjacent to the ridge for sealing to a lens section. One side of the filter glass is supported by the annular ridge. The lens section has a matching sealing edge which is heat sealed to the outer sealing edge of the base to complete the envelope. A plurality of indentations are formed in the lens section adjacent to the edge for contact with the other side of the filter glass.

For a better understanding of the present invention, together with other and further objects thereof, reference is made to the following description taken in connection with the accompanying drawings.

Figure 1:
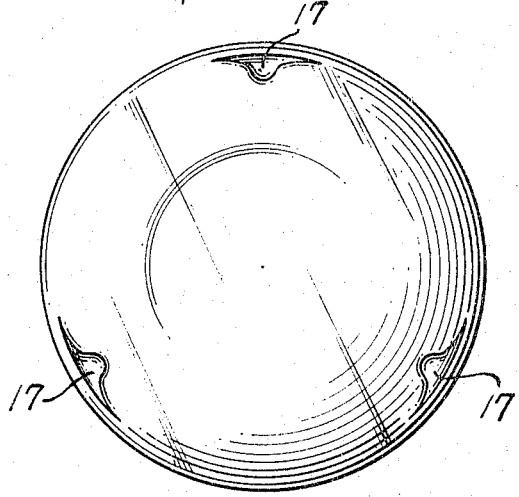
FIG. 1 is a front view of the completed lamp showing three indentations adjacent to the edge of the lamp.
Figure 2:
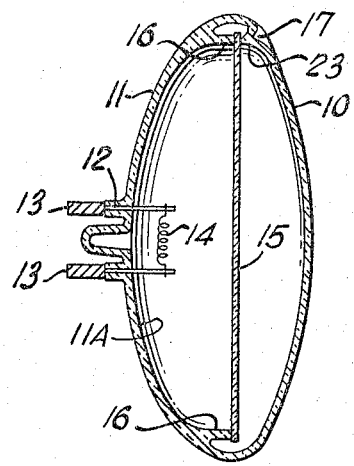
FIG. 2 is a cross sectional view of the lamp shown in FIG. 1 and shows the lead-in conductors, the filter glass, the inner ridge, and one of the indentations which clamp the filter glass in place.

Referring now to FIGS. 1 and 2, the lamp comprises a lens section 10 which may be formed with lens surfaces or other corrugations which aid in directing the light rays into a predetermined pattern. The lamp also includes a base section 11 having a concave reflector surface 11a and lead-in conductors 12 terminated by conductive prongs 13 for insertion into a socket for reception of electrical power. Within the lamp, a tungsten filament 14 is secured to the lead-in conductors. The lamp is not restricted to a single filament but may contain any number of filaments for varying the light intensity and the light beam direction.

In order to give the light a distinctive color, a filter glass 15 is positioned within the lamp. The periphery of this filter rests against a ridge 16 on one side and a plurality of indentations 17 formed in the lens section 10. It has been found that three such indentations give the best result, but the invention is not restricted to this number and two or more may be employed.

Figure 3:
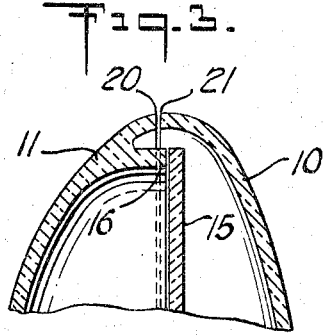
FIG. 3 is a partial cross sectional view showing the lamp components before the sealing operation.
Figure 4:
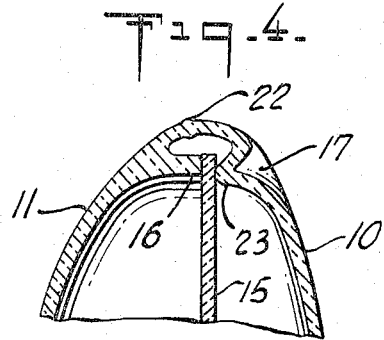
FIG. 4 is a partial cross sectional view similar to FIG. 3 but showing the components after the sealing operation.

The partial cross sectional views shown in FIGS. 3 and 4 illustrate the method of sealing the filter glass. In FIG. 3 the components are shown before the sealing operation wherein the base section has an outer sealing edge 20 and the lens section 10 has a corresponding sealing edge 21. It should be noted that the junction of these two sealing edges is positioned a short distance away from the edge of the filter glass 15. This is because the annular ridge 16 projects a short distance beyond the sealing edge 20.

When the two sections 10 and 11 are placed in contact and when their edges are heated by a flame, a seal 22 (FIG. 4) results. This seal can be made without raising the temperature of the filter glass to a value which destroys its light filtering qualities. After the seal has been made and while the rim of the glass is still hot, three or more indentations are made by forcing a pointed tool against the glass surface of the lens. There results a pointed extension 23 which presses against the edge of the filter glass 15 and holds it firmly against the annular ridge 16.

Figure 5:
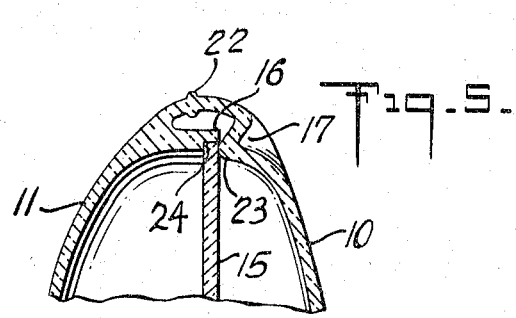
FIG. 5 is a partial cross sectional view similar to FIG. 4 but showing an alternate arrangement of the ridge section.

The partial cross section shown in FIG. 5 illustrates an alternate construction which affords even more protection to the filter glass. In this arrangement the base section is formed with a similar ridge 16 but part of the ridge section is removed leaving a flat annular supporting surface 24. This surface or ledge holds the filter glass as shown in the figure and the ridge 16 retains the filter glass in position and also shields it from the heat of the flame when the glass weld 22 is made.

The above described structures are especially applicable to manufacturing techniques which are performed on automatic or semi-automatic machines and it should be noted that the sequence of operations is quite similar to the program of operations generally used to seal lamps without a filter glass.

The foregoing disclosure and drawings are merely illustrative of the principles of this invention and are not to be interpreted in a limiting sense. The only limitations are to be determined by the scope of the appended claims.

I claim:

1. A sealed beam lamp for producing a colored light beam comprising; a base section including lead-in conductors supporting a filament adapted to radiate light when heated, and a concave reflector, said base section formed with an inner annular ridge; an outer sealing edge on the base section positioned adjacent to said ridge; a filter glass for selective light transmission, said filter glass supported on one side by the annular ridge; a lens section for selectively directing light rays given off by the filament into a predetermined array, said lens section having a sealing edge adapted to be heat sealed to the base sealing edge; and a plurality of indentations pressed into the lens section adjacent to the edge for contact with the other side of the filter glass.

2. A sealed beam lamp for producing a colored light beam comprising; a glass base section including lead-in conductors connected to a filament which is adapted to give off light when heated and a concave reflecting surface, said base section having an inner annular ridge formed integral with the glass base; an outer sealing edge on the base positioned adjacent to said ridge; a filter glass for selective light transmission, said filter glass supported on one side by the annular ridge; a glass lens section sealed to the base at its outer edge; and a plurality of indentations formed in the glass lens section adjacent to the edge and in contact with the other side of the filter glass to hold the filter glass in position.

3. A sealed beam lamp for producing a colored light beam comprising; a glass base section including lead-in conductors, a means for generating light, and a concave reflecting surface for reflecting the light; an outer sealing edge on the base section; an annular ridge formed integral with the base section and spaced from the sealing edge; a filter glass for selective light transmission supported on one side by the annular ridge; a glass lens section sealed to the base at its outer edge; and a plurality of indentations formed in the glass lens section adjacent to the edge and in contact with the other side of the filter glass to hold the filter glass in position.

4. A sealed beam lamp for producing a colored light beam comprising; a glass base section including lead-in conductors, a means for generating light, and a concave reflecting surface for reflecting the light; an outer sealing edge on the base section; an annular ridge formed integral with the base section and spaced from the sealing edge, said ridge including a ledge which projects inwardly and which forms an annular flat area; a filter glass for selective light transmission supported on one side by the annular ledge; a glass lens section sealed to the base at its outer edge; and a plurality of indentations formed in the glass lens section adjacent to the sealing edge and in contact with the other side of the filter glass to hold the filter glass in position.

5. The method of sealing a colored filter glass into a glass envelope comprising the following steps; positioning the filter glass on an annular ridge which is part of a base section of the envelope and which is spaced from a sealing edge of the base section; placing a lens section on the base section with a sealing edge of the lens section in substantial alignment with the sealing edge of the base section; heating the two edges to form a heat weld; and then making a plurality of indentations in the lens section adjacent to the edge for clamping the filter glass in position.

6. The method as claimed in claim 5 wherein the filter glass is positioned on an annular ledge adjoining the ridge.

7. The method as claimed in claim 5 wherein the heat weld is permitted to cool before making the indentations.

8. A glass lamp envelope containing a colored glass filter comprising; a circular glass base section formed with an outer sealing edge; an annular ridge formed integral with the base section and adjacent to the sealing edge; a filter glass for selective light transmission; said filter glass supported on one side by the annular ridge; a circular glass lens section having a sealing edge of substantially the same size as the sealing edge of the base section and adapted to be heat sealed to the base section; and a plurality of indentations pressed into the lens section adjacent to the sealing edge for contact with the other side of the filter glass.

No references cited.

JAMES W. LAWRENCE, *Primary Examiner.*

P. C. DEMEO, *Assistant Examiner.*